UNITED STATES PATENT OFFICE.

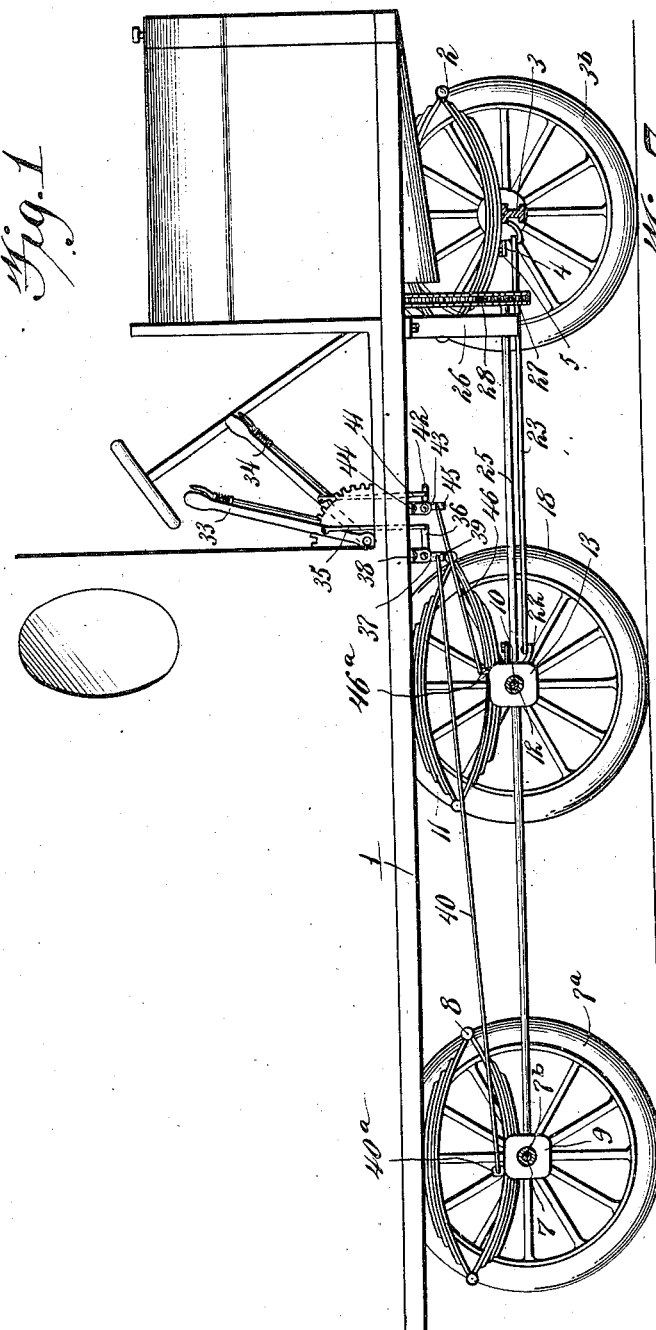

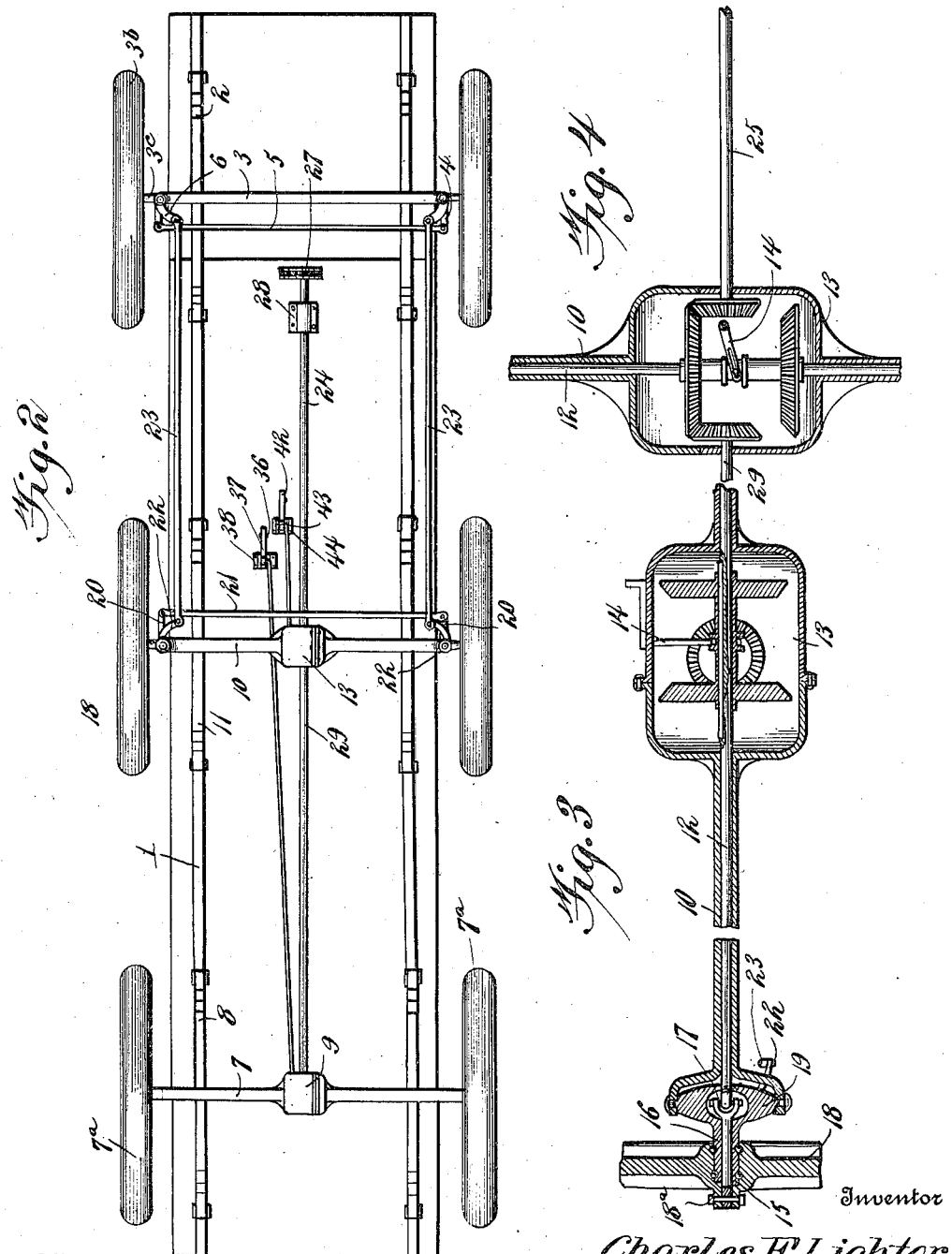

CHARLES E. LIGHTER, OF MASON CITY, IOWA.

MOTOR-VEHICLE.

1,093,445.  Specification of Letters Patent.  Patented Apr. 14, 1914.

Application filed June 1, 1912. Serial No. 701,005.

*To all whom it may concern:*

Be it known that I, CHARLES E. LIGHTER, a citizen of the United States, residing at Mason City, in the county of Cerro Gordo and State of Iowa, have invented new and useful Improvements in Motor-Vehicles, of which the following is a specification.

My invention relates to motor vehicles, the object being to provide a propulsion axle, a principal steering axle, and one or more intermediate axles adapted for use both in the steering and propulsion of the vehicle.

An object of the invention is the provision of means connecting the steering mechanism of the principal steering axle with the steering mechanism of the intermediate axle or axles.

A further object is the provision of means by which power may be applied to any one of the individual propulsion axles, or collectively to the same.

Further objects of the invention will appear as the following specific description is read in connection with the accompanying drawings, which form a part of the application, and in which—

Figure 1 is a side elevation. Fig. 2 is a bottom plan view. Fig. 3 is a fragmentary longitudinal sectional view of one of the intermediate axles, showing the clutch mechanism. Fig. 4 is a fragmentary, horizontal section view of the same. Fig. 5 is a fragmentary plan view of the rear axle. Fig. 6 is a detail perspective view of the clutch operating member. Fig. 7 is a fragmentary perspective view of one end of the front axle and the movable spindle, showing the steering mechanism attached thereto.

In the drawings, the numeral 1 designates the chassis of the machine to which is secured, by means of the usual springs 2, the forward steering axle 3. The spindle posts 3$^a$ secured to this axle 3 are provided, in addition to the operating arms 4 connected by the cross bar 5, with inwardly and downwardly curved arms 6 for a purpose which hereinafter will be more fully described. Suitable wheels 3$^b$ are mounted upon the spindles 3$^c$ carried by the spindle posts 3$^a$.

The stationary axle 7 is secured to the chassis near its rear end by means of the springs 8, and this axle is provided with a gear casing 9 in which is housed a convenient form of clutch mechanism, which is clearly shown in Fig. 5. Wheels 7$^a$ are mounted on the spindles of the rotatable axle or shaft 7$^b$ journaled in the axle 7.

As shown in the drawings, an intermediate axle 10 is mounted beneath the chassis between the axles 3 and 7 by the springs 11. This axle 10 is made hollow for the reception of the shaft 12, and is provided with an integrally formed casing 13 for the clutch mechanism 14. The extremities of the shaft 12 are connected to the active spindles 15 mounted within the bearing spindles 16 by means of the universal joints 17, and the outer ends of the active spindles 15 are fixedly and removably connected to the hubs of the wheels 18 as shown at 18$^a$. The spindle posts 19 are provided with lateral arms 20, whose extremities are pivotally secured to the connecting rod 21, and also are provided with the additional downwardly and forwardly curved arms 22, whose extremities are pivoted to the rear ends of the longitudinal connecting rods 23. These connecting rods 23 have their forward extremities pivoted to the extremities of the curved arms 6 on the spindle posts of the principal steering axle, so that turning movement of the spindle posts of the principal axle will impart, through the medium of the connecting rods 23, corresponding turning movement to the spindle posts of the intermediate axle.

A sectional drive shaft 24 has its forward section 25 journaled in the bearing box 26 and in the clutch casing 13 on the intermediate axle. This section 25 has a sprocket wheel 27 fixedly secured to its forward extremity, and this sprocket wheel is connected by a chain 28 to the crank shaft of the engines (not shown). The rear end of the shaft section 25 is connected to the forward end of a second section 29 journaled in the clutch casings 9 and 13 of both propulsion axles, by means of the clutch mechanism 14, which latter is operatively associated with the shaft 12 so as to permit rotation of the same in either direction.

In Fig. 1 it will be seen that I have provided hand levers 33 and 34 in suitable proximity to the operator's seat, so that operation of the same will throw the clutch mechanisms carried by the casings 9 and 13. A vertical connecting rod 35 has its upper end pivoted to the hand lever 33, and passing through the floor of the vehicle, has its lower end pivoted to the arm 36 of the rocker member 37, which latter is mounted on the under surface of the chassis 1 by means of the bracket 38. The arm 39 of the rocker member is positioned angularly with respect to the arm 36 and has the forward end of a horizontal, longitudinally extending connecting rod 40 pivoted to its extremity. The rear end of the rod 40 passes through an opening in the rear casing 9 carried by the axle 7, and is secured to the clutch operating lever 40ª mounted therein. A second vertical connecting rod 41 extending through the floor of the vehicle, has its upper end pivoted to the hand lever 34 and its lower end pivoted to the normally horizontal arm 42 of the rocker member 43, which latter is mounted beneath the chassis 1 adjacent the rocker member 37 by means of the bracket 44. The angularly disposed arm 45 of the rocker member 43 has its extremity pivoted to the forward end of a second horizontal connecting rod 46, whose rear end passes into the casing 13 of the intermediate axle 10 and is secured to the clutch operating lever therein.

The engines of the machine are arranged so that one or more of the same may be connected to the sectional drive shaft. This permits the use of the desired amount of power, and the application of the power may be further regulated by means of the clutch mechanisms. On certain occasions it may be found desirable to cut off the power from the intermediate axle, this being accomplished by drawing the hand lever 34 in the proper direction, depending upon the direction in which the machine is moving. Throwing the hand levers 33 or 34 in either direction from the inoperative position will apply the power to the driving axles to propel the vehicle either forward or backward. This use of intermediate axles is designed to prevent a large percentage of the jar occasioned by the passage over uneven ground, and also to permit the vehicle to make sharper turns in its course. In passing over a depression in the ground, for instance, two sets of wheels at least will be on level ground, while the other will ride over the depression. By employing brake attachments in connection with the intermediate axle, the braking power of the machine will be doubled.

I claim:—

1. In a motor vehicle, the combination with a chassis, of a propulsion axle carried thereby, wheels carried by said axle, a principal steering axle mounted on said chassis, wheels carried by said steering axle, an intermediate axle mounted on said chassis, said axle being adapted for use in propulsion and steering, means by which said steering axle may be operated, means connecting the steering mechanism of said principal steering axle with the steering mechanism of the intermediate axle to cause corresponding operation of the same, means by which the intermediate propulsion axle may be operated independently, and means by which the first-named propulsion axle may be operated while the said intermediate axle is in operation.

2. In a motor vehicle, the combination with a chassis, of a propulsion axle carried thereby, wheels carried by said axle, a principal steering axle mounted on said chassis, wheels carried by said steering axle, an intermediate axle mounted on said chassis, said axle adapted for use in propulsion and steering, means by which said steering axle may be operated, means connecting the steering mechanism of said principal steering axle with the steering mechanism of the intermediate axle to cause corresponding operation of the same, reversible means by which the intermediate propulsion axle may be operated independently, and means by which the first-named propulsion axle may be operated while the said intermediate axle is in operation.

3. In a motor vehicle, the combination with a chassis, of a propulsion axle carried thereby, wheels carried by said axle, a principal steering axle mounted on said chassis, wheels carried by said steering axle, an intermediate axle mounted on said chassis, said axle adapted for use in propulsion and steering, means by which said steering axle may be operated, means connecting the steering mechanism of said principal steering axle with the steering mechanism of the intermediate axle to cause corresponding operation of the same, reversible means by which the intermediate propulsion axle may be operated independently, and reversible means by which the first-named propulsion axle may be operated while the said intermediate axle is in operation.

4. In a motor vehicle, the combination with the chassis thereof, of a stationary principal axle attached thereto, a principal steering axle having movable spindles, wheels mounted upon said spindles, an intermediate axle having movable spindles, wheels mounted on said spindles, a longitudinal shaft rotatably mounted in said intermediate axle, means operatively connecting the ends of said shaft with the wheels on the spindles of the intermediate axle, a gear casing formed on said intermediate axle, an operating shaft section having one end journaled in said casing and extending forwardly therefrom, means for attaching a source of power to said shaft section, a gear casing formed on the stationary axle, a longitudinal shaft journaled in said stationary axle and having spindles, wheels mounted fixedly upon said spindles, a second operating shaft section having its ends journaled in both gear casings, a clutch mechanism in the gear casing carried by the intermediate axle, means by which said mechanism may be operated to connect the first-named operating shaft section with the longitudinal wheel-connected shaft in said intermediate axle to cause rotation of the latter shaft in either direction or for rendering the same inoperative, clutch mechanism in the gear casing upon the stationary axle, and means for operating the said clutch mechanism to connect the longitudinal wheel-attached shaft in said axle with the second-named operating shaft section to cause rotation of the said wheel-attached shaft in either direction or to render the same inoperative.

In testimony whereof I affix my signature in presence of two witnesses.

CHARLES E. LIGHTER.

Witnesses:
W. R. EDWARDS,
HARDY F. POOL.